United States Patent
Tseng

[11] Patent Number: 5,827,457
[45] Date of Patent: Oct. 27, 1998

[54] METHOD FOR MANUFACTURING A LIGHTWEIGHT CERAMIC FOAMED SUBSTANCE

[76] Inventor: Chao-Ming Tseng, 1F, No. 7, Lane 145, Ying-Tao Road, Ying Ko Chen, Taipei Hsien, Taiwan

[21] Appl. No.: 940,017

[22] Filed: Sep. 29, 1997

Related U.S. Application Data

[63] Continuation-in-part of Ser. No. 574,365, Dec. 18, 1995, abandoned.

[51] Int. Cl.$^6$ .............................. C04B 38/00; C04B 38/08
[52] U.S. Cl. ............................. 264/43; 264/628; 264/652; 501/85
[58] Field of Search ............................. 264/43, 628, 652; 501/85, 574, 265

[56] References Cited

U.S. PATENT DOCUMENTS

| | | | |
|---|---|---|---|
| 2,583,292 | 1/1952 | Bowen et al. | 501/85 |
| 3,203,813 | 8/1965 | Gajardo et al. | 501/85 |
| 3,274,310 | 9/1966 | Kohl | 264/43 |
| 3,833,386 | 9/1974 | Wood et al. | |
| 3,958,582 | 5/1976 | Noda et al. | |
| 4,248,810 | 2/1981 | Erksine | 264/43 |
| 4,336,068 | 6/1982 | Vogel et al. | |
| 4,740,486 | 4/1988 | Keller, Jr. | |
| 4,780,433 | 10/1988 | Keller, Jr. | |
| 4,822,541 | 4/1989 | Nagai et al. | |
| 4,900,698 | 2/1990 | Lundsager | |
| 5,082,607 | 1/1992 | Tange et al. | |
| 5,256,222 | 10/1993 | Shepard et al. | |

FOREIGN PATENT DOCUMENTS

| | | | |
|---|---|---|---|
| 2057302 | 2/1990 | Japan | 264/43 |

Primary Examiner—James Derrington
Attorney, Agent, or Firm—Browdy and Neimark

[57] ABSTRACT

A method for manufacturing a lightweight foamed ceramic body from components comprising: (a) at least one expandable volcanic mineral; (b) at least one alkaline earth metal oxide, hydroxide, or carbonate, (c) at least one inorganic binder and (d) a foaming stabilizer, the method comprising: (1) sintering and expanding a mixture of components (a) to (d); (2) mixing the sintered and expanded material with water; (3) grinding the mixture of sintered and expanded material with water to form a ground mixture; (4) drying said ground mixture to form a dried mixture; (5) crushing said dried mixture to form a fine powder; (6) shaping said powder into a desired form to form a powder form; and (7) sintering said powder form. The ceramic material is preferably manufactured in a tunnel-type kiln. The resulting foamed ceramic is not only light in weight, but excellent in insulating properties due to its discrete cell of closed cellular structure. The foamed ceramic is useful in structural and building materials.

5 Claims, 1 Drawing Sheet

5,827,457

METHOD FOR MANUFACTURING A LIGHTWEIGHT CERAMIC FOAMED SUBSTANCE

FIELD OF THE INVENTION

The present application is a continuation in part of application Ser. No. 08/574,365, filed Dec. 18, 1995 now abandoned. The entire contents of this application are hereby incorporated by reference.

The present invention relates to a method for manufacturing a lightweight ceramic foamed substance which is particularly useful for structural and building materials.

BACKGROUND OF THE INVENTION

There is a great demand for making buildings and other structures resistant to fire. Accordingly, there is a demand for heat resistant structural materials which can prevent spread of fires through a building or from building to building. Additionally, lightweight structural materials are particularly desirable for construction of tall buildings.

Foamed polymeric materials, such as polystyrene foams, polyurethane foams, or polyethylene foams are known to have excellent thermal insulating properties and are thus useful as construction materials. However, all of these materials are flammable, since they are based on organic compounds. Moreover, these materials do not have satisfactory thermal resistance to prevent spread of fire. In particular, damages caused by soot and toxic gases generated from materials based on organic compounds during burning are becoming an increasing problem.

Inorganic forms, such as ceramic foam, light porous concrete, and the like, have also been developed as structural materials. These materials, which are not based upon carbon compounds, have excellent non-flammability characteristics as well as heat resistance. These materials are produced either by setting at relatively low temperatures or by sintering at high temperatures to form products which have an open cellular structure. Unfortunately, these materials, by virtue of their open porous structure, absorb water to a great degree and are not good thermal insulators.

Foamed materials having a variety of characteristics are known. For example, U.S. Pat. No. 3,833,386, discloses a polymeric-sponge method for making foamed materials. A hydrophilic crosslinked polyurethane foam is produced by reacting an isocyanate-capped polyol with a slurry of finely divided ceramic particles. The final steps include burning out the organic crosslinked network and sintering the material.

U.S. Pat. No. 3,958,582, discloses a method of making a heat-insulating structure which comprises introducing into a casing an aqueous slurry comprising monoaluminum phosphate, foamable perlite and ceramic fibers, and firing the slurry within the casing.

U.S. Pat. No. 4,336,068, discloses a composition for producing inorganic foams. The foams, which are foamed with carbon dioxide gas and set with microwaves, comprise mainly perlite, kaolin, polyester, and water glass.

U.S. Pat. Nos. 4,780,433 and 4,740,486, disclose a composition for building blocks comprising cement, ceramic grog and ceramic aggregate. These components are formed as a mixture of clay and dried organic mulch. After firing, the resulting ceramic product is porous.

U.S. Pat. No. 4,822,541, discloses a method of producing a porous ceramic panel. The foaming body is first-pressed in a foaming step. After the foaming step, the first-pressed foamed body is second-pressed, in order to obtain superior dimensional accuracy and surface smoothness. The composition used to prepare this porous ceramic panel includes clay, silica soda ash, sodium nitrate, dolomite limestone, and silicon carbide.

U.S. Pat. No. 4,900,698, discloses a ceramic product and process. In a preferred embodiment, the metal and ceramic filler are bound together with clean burning polyolefin and a plasticizer. After molding, the mixture is formed into the final shape and the plasticizer is removed to introduce porosity into the shaped article. The article is then heated to decompose the polyolefin, which exits as a gas through the pore openings. The article is finally burned to form a sintered porous ceramic.

U.S. Pat. No. 5,082,607, discloses a process for producing a porous ceramic by mixing a ceramic powder, a polymerizable unsaturated compound, an emulsifying agent, and water with stirring to provide an inverted emulsion. The unsaturated compound is polymerized by free radical polymerization or redox polymerization to cure the inverted emulsion. The cured product thus obtained is then dried and fired.

U.S. Pat. No. 5,256,222, discloses a lightweight wallboard comprising expanded perlite, inorganic binder, magnesium oxide, and magnesium chloride. The manufacturing process is also disclosed.

As described above, there are a variety of known ceramic foam products and processes for preparing them. However, none of the above teachings is directed to a ceramic foamed body which is sintered at a high temperature (i.e., above about 1000° C.) which is light in weight and has discrete cells which are closed.

It is well known to produce foamed bodies from cement materials. For example, it is known to produce lightweight aggregates such as perlite, foamed silica, or the like. The known processes further include a process comprising adding aluminum metal to cement with water to produce hydrogen gas and heating the mixture in an autoclave at increased pressure to effect hydration for hardening with this process, however, foaming and hardening steps require a prolonged period of time.

In another cold-setting process, for compositions comprising mainly aluminum phosphate and calcium silicate, the composition is foamed and then cured at room temperature within a short period of time. However, a minor portion of unreacted residue may exist in the foamed body because of incomplete curing.

SUMMARY OF THE INVENTION

It is an object of the present invention to overcome the aforesaid deficiencies in the prior art.

It is another object of the present invention to prepare a light weight foamed ceramic body.

It is another object of the present invention to provide a new method for manufacturing ceramic foamed bodies which have excellent thermal and water insulating properties as well as excellent resistance to chemicals.

It is a further object of the present invention to provide a new method for manufacturing ceramic foamed bodies which do not include organic compounds in the ingredients.

It is another object of the present invention to provide a new method for manufacturing ceramic foamed bodies wherein the overall manufacturing process does not generate any harmful byproducts, and the foaming and sintering processes are conducted at temperature of about 705° C. to about 1100° C.

It is a further object of the present invention to provide a new method for manufacturing ceramic foamed bodies having discrete cells of closed cellular structure which has a low bulk density of about 0.1 to about 0.9.

Another object of the present invention is to provide a method for manufacturing ceramic foamed bodies in which four specific inorganic compounds are mixed in proper proportional weight, and processing the mixture in seven special steps:

1. Sintering and expanding the mixture;
2. Mixing the mixture with water;
3. Grinding the mixture;
4. Baking the mixture;
5. Powdering the mixture;
6. Shaping the mixture; and
7. Sintering the mixture.

A further object of the present invention is to provide a method for manufacturing ceramic foamed bodies using a tunnel-type kiln to provide a continuous process. In steps 6 and 7 above, the powder can be evenly fed into delivery carts made of fire resistant bricks and having an open top by way of a precisely controlled cone-shaped vibrational feeding device. The carts are sequentially led through a heating area a sintering and foaming area, an area of lower temperature, and a cooling area to produce foamed ceramics which has discrete pores.

According to the present invention, a lightweight foamed ceramic body is manufactured by sintering a mixture of the following components (a) to (d) and expanding the mixture:

(a) at least one expandable glassy volcanic material which contains acidic silica as the major component;
(b) at least one alkaline earth metal oxide, hydroxide, or carbonate;
(c) an inorganic binder comprising at least one alkali metal silicate; and
(d) a foaming stabilizer comprising at least one member selected from the group consisting of talc, mica, silica gel and zeolite.

A suitable amount of water is added to adjust the viscosity of the mixture. The mixture is then ground in a ball mill to obtain a uniform slurry (over about 100 mesh), and allowed to dry in an oven at a temperature of more than about 150° C. the dried material is next crushed in a crushing mill to form a finely divided powder (finer than about 200 mesh) which is then formed into a desired shape. Finally, the shaped powder is sintered in a kiln at a temperature of more than about 750° C. for at least one hour. The foamed ceramic obtained by this process is not only light in weight, with a bulk density of from about 0.1 to 0.9, but has excellent insulating properties because of its discrete, closed cells. The foamed ceramic material of the present invention is particularly useful for building materials because of the light weight and excellent insulating properties combined with its heat and fire resistance.

The present invention provides a new method for manufacturing a ceramic foamed body comprising mixing together the following four components in particular proportions:

(a) at least one expandable glassy volcanic mineral which contains acidic silica as the major component, preferably 15–30% by weight;
(b) at least one alkaline earth metal oxide, hydroxide, or carbonate, preferably 3–10% by weight;
(c) an inorganic binder comprising at least one alkali metal silicates; preferably 45–70% by weight;
(d) a foaming stabilizer, comprising at least one member selected from the group consisting of talc, mica, silica gel and zeolite, preferably 4–15% by weight.

The total weight of the four components is 100%.

The material of the present invention is produced by the following steps in sequence:

1. Sintering the mixture of components (a) to (d) above to expand the mixture;
2. Mixing the expanded mixture with water;
3. Grinding the mixture;
4. Drying or baking the mixture;
5. Powdering the mixture;
6. Shaping the mixture;
7. Sintering the shaped mixture to produced light weight, fire proof and sound-proof foamed ceramics.

the shaping and sintering procedures are preformed in a tunnel-type kiln which has been particularly designed for the present invention. In this kiln, serially connected carts move along a track through the tunnel-shaped kiln, the powdered mixture obtained in step 5 is precisely fed by means of a coneshaped vibrational feeding device which has an input port of about 2.6 meters in diameter and a height of about 3.3 meters. Each of the serially connected carts has a length of about 2.3 meters and a width of about 1.3 meters. The carts are sequentially led through a heating area, a sintering and foaming area, a temperature lowering area and a cooling area so as to produce cellular foamed ceramics having discrete cells of a closed cellular structure.

The foamed ceramics of the present invention can be used as construction materials, as well as building materials in KTV resorts. The density of the foamed ceramic material is less than water, yet it is structurally strong. Because of its buoyancy and strength, it can be used as an emergency float for aircraft or navigational vessels, including a temporary landing platform for a helicopter or a bridging material for military purposes.

DETAILED DESCRIPTION OF THE INVENTION

Figure 1:
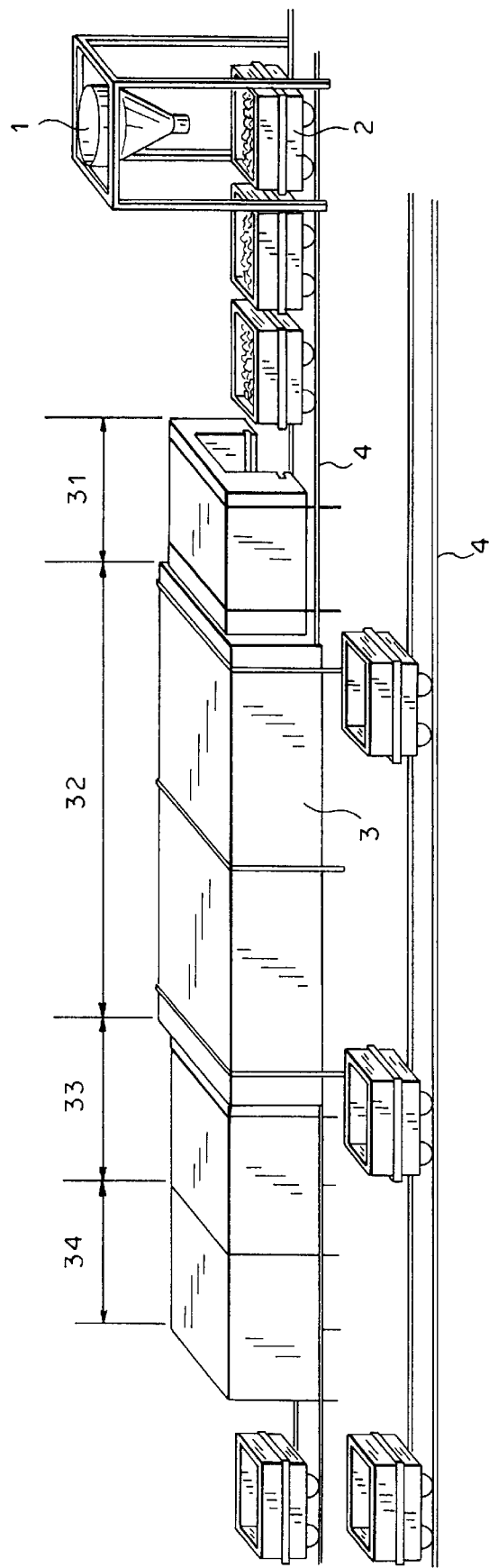
FIG. 1 is a diagram showing a tunnel-type kiln according to the present invention.

The present invention provides a new method for manufacturing a ceramic foamed body comprising four components that are proportioned in the following weight percentages:

(a) about 15–30% of at least one expandable glassy volcanic mineral which contains acidic silica as the major component;
(b) about 3–10% by weight of at least one alkaline earth metal oxide, hydroxide, or carbonate or mixtures thereof;
(c) about 45–70% by weight of an inorganic binder comprising at least one alkali metal silicate;
(d) about 4–15% by weight of a foaming stabilizer, comprising at least one member selected from the group consisting of talc, mica, silica gel and zeolite.

The foamed ceramic is produced by conducting the following steps in the order given:

1. Sintering and expanding a mixture of components (a) through (d);
2. Mixing the sintered expanded mixture with water;
3. Grinding the mixture;

4. Drying the mixture;
5. Powdering the mixture;
6. Shaping the mixture;
7. Sintering the mixture top produce a light weight, fire proof and sound proof ceramic substance.

Preferably, the sintering process of step 1 is conducted at a temperature of about 650°–750° C. to provide a more uniform slurry in the subsequent mixing step.

Referring to FIG. 1, steps 6 and 7 can be conducted in a conventional batch type kiln (such as a shuttle-type kiln) or a totally new, continuous tunnel-type kiln which has been particularly designed for the present invention. A tunnel-type kiln is equipped with a plurality of serially connected carts 2 and a tunnel 3 having a heating area 31, a sintering and foaming area 32, a temperature-lowering area 33, and a cooling area 34 disposed in sequence. A track 4 and a cone-shaped vibrational feeding device having a precise control system are provided.

The feeding device 1 disposed above track 4 has an inlet of approximately 2.6 meters and a height of approximately 3.3 meters. The connected carts 2 move on the track 4. Each cart is open topped and is made of fire-resistant bricks having a thickness of about 10 cm; the cart is about 2.3 meters long and about 1.3 meters wide. The track 4 is led through the tunnel of the kiln 3.

When step 5 is completed, the powder obtained is delivered to the feeding device 1 and is fed by way of vibration into carts 2 which are led sequentially into the 45 meter tunnel kiln 3 along track 4 via the heating area 31 at a temperature of about 500°–600° C., sintering area 32 at about 600°–1000° C., a temperature lowering area 33 at 500°–700° C., and a cooling area 34 at about 250°–450° C. When the products in the cart 2 are moved out of the cooling are 34 of the kiln and contact air, they quickly cool to room temperature (about 25° C.) and are cut into the preferred size and shape so as to obtain the ceramic products of the present invention.

According to the present invention, the preferred ingredients for the four components (a) through (d) are described as follows:

(a) An expandable glassy volcanic material, such as perlite, is the preferred material of component (a). Perlite is a naturally occurring siliceous volcanic rock which, when heated to a temperature between 1400° F. and 1600° F. expands to between four and twenty times its original volume. Perlite typically contains about 70–75% by weight silica, about 12–15% by weight of alumina. about 0.5–6% by weight of bound water, about 2–5% by weight of sodium oxide, about 206% by weight of potassium oxide, about 0.5–5% by weight of low volatiles, and a minor amount of of iron(III) oxide, titanium dioxide, calcium oxide, and magnesium oxide. Perlites are usually classified according to the water content. Obsidian has up to 2% water, perlite has from 2–6% water, and pitch stone, over 5% water. The expanded siliceous inorganic aggregate used in the present invention has a density in the range of 2 pcf to about 4 pcf. The density of the aggregate affects the ultimate strength of the foamed material. the preferred material is expanded perlite, although other types of expanded particular material can also be used.

While expanded perlite is the preferred material for component (a), unexpanded perlite can also be used. However, because unexpanded perlite contains more impurities than expanded perlite, the products made from unexpanded perlite have less purity, and thus less transparency, lees glassification, and poor colors. Moreover, foamed ceramic materials according to the present invention made from unexpanded perlite have a higher density than foamed ceramic materials made from expanded perlite. Generally speaking, unexpanded perlite contains about 5–20% impurities by weight. After perlite is expanded by heating, the large portion of impurities having high specific gravities can be removed.

The particle size of the aggregate is preferably particles which have an average diameter of 100 to 1000 microns, and more preferably in the range of about 500 to about 700 microns.

(b) Alkaline earth metal oxides, hydroxide, or carbonates. Preferred alkaline earth metal oxides are calcium oxide, magnesium oxide, barium oxide, and the like. Preferred composite oxides include CaO.MgO. Preferred hydroxides are calcium hydroxide, magnesium hydroxide, and barium hydroxide; preferred composite hydroxide include $Ca(OH)_2$.$Mg(OH)_2$. Preferred alkaline earth carbonates are magnesium carbonate, calcium carbonate, and magnesium carbonate. Additionally, aluminates or silicates of alkaline earth metal oxides can be used as all or part of component(b); preferred compounds are $CaO.Al_2O_3$ and $MgO.Al_2O_3$, or $CaO.SiO_2$ and $MgO.SiO_2$. Mixtures of any of these compounds can be used in any proportions.

The average diameter of the particles of the oxides, hydroxides or carbonates is about 10 to about 100 microns, and preferably in the range of about 5 to about 50 microns.

(c) The inorganic binder to be used in the present invention comprises at least one alkali metal silicate. The alkali metal silicates which are used in the present invention are aqueous alkali silicates. Depending upon the type of alkali metal, the alkali metal silicate is represented by a formula $Na_2O.nSiO_2$ or $K_2O.nSiO_2$, where n is preferably from about 2.0 to about 3.0. For best fabrication, the silicate should have a specific gravity of from about 35 to about 43 Baume and preferably from about 36 to about 41 Baume. Preferred alkali metal silicates are aqueous sodium silicates. However, mixtures of any alkali metal silicates which provide the desired specific gravity can be used. The inorganic binder, which may also be known as "water glass" serves to bind components (a), (b) and (d) together to ensure a homogeneous mixture in aqueous media.

(d) The foaming stabilizer to be used in the present invention is at least one of the group consisting of talc ($H_2Mg_3Si_4O_{12}$), mica ($KAlSiO_4$), silica gel ($H_2SiO_4$) and zeolite ($Na_2$).$Al_2O_3.2SiO_2$.$nH_2O$). With respect to the zeolite, both natural and artificial zeolites can be used. The use of a foaming stabilizer insures uniform foaming, leading to the production of foamed bodies of uniform quality.

The following non-limiting examples further exemplify the present invention.

Example 1

1. A mixture of 43 grams of expanded perlite powder, 20 grams magnesium carbonate, 150 grams of aqueous silicate, and 10 grams of talc were sintered to expand the mixture. The expanded mixture was added to 50 grams of water in a 500 cc vessel in a mixture procedure. The mixture was evenly ground until the 100 mesh particles were transformed into finer particles.
2. The above finely ground mixture was put into an oven to dry at about 200° C.
3. The mixture was removed from the oven and the dried substance was crushed and ground into a fine powder. This powder was introduced into a fire resistant mold which was put into the top of a small-scale gas testing kiln. When the temperature of the kiln reached 750° C., the mixture was maintained in the oven for one hour. The mixture was cooled off to obtain a white light weight ceramic substance having a specific density of 0.12.

Example 2

Example 1 was repeated, but the temperature of the kiln in step 3 was changed to 860° C. and maintained for one hour. the final product was a white light weight ceramic substance of specific density of 0.25.

Example 3

A mixture of 60 grams expanded perlite powder, 10 grams magnesium oxide, 160 grams aqueous sodium silicate, 80 grams of talc and 120 grams of water were placed into a 500 cc vessel and the steps of Example 1 were repeated except that the temperature of step 3 was 900° C. The final product was a white light weight ceramic substance of specific density of 0.37.

Example 4

A mixture of 68 grams expanded perlite powder, 15 grams magnesium oxide, 5 grams calcium carbonate, 100 grams aqueous sodium silicate, 50 grams aqueous potassium silicate, 40 grams of talc, and 10 grams of mica were sintered to expand the mixture. This mixture was added to 100 grams of water in a 500 cc vessel. Steps 2 to 4 in Example q were repeated, except that the temperature of step 3 was 980° C. The final product was a white light weight ceramic substance of specific density of 0.56.

Example 5

A mixture of 78 grams unexpanded perlite powder, 12 grams calcium oxide, 12 grams magnesium oxide, 130 grams aqueous sodium silicate, and 6 grams talc were sintered to expand the mixture. The expanded mixture was added to 105 grams water in a 500 cc vessel and the steps of Example 1 were repeated except that the temperature of step 3 was chanted to 1000° C. the final product was a white light weight ceramic substance of specific density 0.93.

Example 6

Perlite was replaced by obsidian in the above examples, with the identical steps in each example repeated. The Final product was a gray-purple, light weight ceramic substance having a specific density in the range of 0.04–0.12, but having a hardness lower than for the ceramic substances made with perlite.

Example 7

The following components were mixed: 24% by weight expanded perlite, 5% magnesium oxide, 2% magnesium carbonate, 30% aqueous sodium silicate, 22% aqueous potassium silicate, 14% of a mixture of silica gel and talc. The mixture was sintered to expand the mixture, and the mixture was added to a suitable amount of water. The mixture was ground, dried and crushed and powdered into particles of 400 mesh and put into the continuous tunnelshaped kiln of the present invention to sinter the mixture at a temperature of 950° C. for one hour. The mixture was then led through a temperature lowering area 33 and a cooling area 34. The produce was a white, light weight ceramic substance of specific density of 0.48.

The ceramic substance produced in Example 7 was cut into test samples of 3×3×1 cm. for testing stability of the product.

To test water resistance, six samples were secured to glass plates of 0.4 kg and plunged into water for two days. The appearance of the samples was examined for changes due to the immersion in water.

To test acid resistance, six samples were secured to glass plates or 0.4 kg and plunged into 1N hydrochloric acid for two days. The appearance of the samples was examined for changes resulting from immersion in acid.

To test resistance to alkali, six samples were secured to 0.4 kg glass plates and immersed in a saturated solution of calcium hydroxide for two days. The appearance of the samples was examined for changes resulting from immersion in alkali.

To test heat resistance, six samples were put into a kiln which was maintained at 500° C. for 24 hours. The samples were then tested for deformation.

After the tests were conducted and the samples examined, it was found that all of the samples conformed to standards set for water resistance, acid, resistance, alkali resistance, and heat resistance. Ceramic substances produced according to the present invention are light in weight, fire proof, and sound proof.

in order to test the water absorbability of the ceramic substances of the present invention, six samples were floated on top of water for 90 days. No water had been absorbed into the ceramic substances, confirming that the ceramic material of the present invention does indeed have discrete cells of closed cellular structure.

In summary, the ceramic material of the present invention has the following features:

1. High stability: the raw materials used to make the ceramic material are highly stable inorganic substances. No materials based on organic compounds are used.
2. No harmful by-products are produced during manufacture of the ceramic substances. In producing the ceramic substances according to the present invention, no by-products that would contaminate the environment are produced.
3. Fire resistance: Because the sintering process of the present invention occurs at a temperature higher than 750° C., the ceramic materials of the present invention are resistant to temperatures higher than 800° C.
4. Light weight: Because of the discrete cellular structure of the ceramic materials of the present invention, the specific density of the ceramic materials is from about 0.1 to about 0.9. The ceramic material is lighter than water, so that it can float in water. It is also sound-proof.
5. Tunnel-type kiln: The tunnel-type kiln of the present invention eliminates the requirement for advance shape pressing which is used in a contention dry-type process.

The foamed ceramic materials of the present invention can be manufactured by sintering the four components (a) to (d) to expand the mixture, and mixing the mixture with a suitable amount of water to adjust the viscosity of the mixture. The density of the final produce depends upon the proportions of the four components used to form the ceramic material. Generally, the mixture is ground in a high-speed ball mill for at least 60 minutes to obtain a uniform slurry having a particle size of about 100 to 1000 mesh, and dried in a convection oven at a temperature of up to about 150°–200° C. for at least four hours. the dried material is then crushed in a vibrational crushing mill for at least one hour to form a finely divided powder having a particle size of about 200 to 400 mesh. This powder is formed into a mold, which may be, for example, 12 in×10 in×1 in. finally, the shaped powder is sintered in a shuttle kiln, which is fueled by gasoline, at a temperature of about 750°–1100° C. of about 1 to 1.5 hours. The average rate of temperature increase is generally about 6–10° C./min. to control the sintering and foaming effects, it is critical to balance the sintering time and final temperature. Not only the components, but also the sintering condition, affect the properties of the final products, such as bulk density, the cell size and mechanical strength.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method for manufacturing lightweight ceramic foamed bodies made of (a) at least one expandable volcanic mineral; (b) at least one alkaline earth metal oxide, hydroxide, or carbonate, (c) at least one inorganic binder; and (d) a foaming stabilizer, the method comprising:

(1) sintering and expanding a mixture of components (a) to (d) to prepare a material;
   (2) mixing the sintered and expanded material with water;
   (3) grinding the mixture of sintered and expanded material with water to form a ground mixture;
   (4) drying said ground mixture to form a dried mixture;
   (5) crushing said dried mixture to form a fine powder;
   (6) shaping said powder into a desired form to form a powder form; and
   (7) sintering said powder form.

2. A method for manufacturing a lightweight ceramic foamed body according to claim 1 wherein the components (a) to (d) in the mixture are mixed in proportions by weight, respectively, of (a) 15–30%, (b) 3–10%, (c) 45–70%, and (d) 4–15%.

3. A method according to claim 1 wherein said expandable volcanic material contains silica as a major component; said inorganic binder is at least one alkali metal silicate; and said foaming stabilizer is at least one of talc, mica, silica gel, and zeolite.

4. A method according to claim 3 wherein said expandable volcanic mineral comprises at least one of obsidian, perlite and pitch stone; said alkaline earth metal oxide, hydroxide or carbonate is at least one of CaO, $MgCO_3$, $CaCO_3$, $CaO.SiO_2$, MgO, $Ca(OH)_2$, and $Mg(OH)_2$; and wherein said alkali metal silicate is at least one of sodium silicate and potassium silicate.

5. A method according to claim 1 wherein steps (6) and (7) are carried out in a tunnel kiln having a plurality of serially connected carts which are led into said kiln sequentially through a heating area, a sintering area, a temperature lowering area, and a cooling area;

wherein each said cart is made of fire-resistant bricks and has an open top and moves along rails and said fine powder is fed into each cart by way of a precisely controlled vibrational feeding means disposed at one end of said kiln.

* * * * *